United States Patent [19]

Weingart

[11] Patent Number: 4,860,351

[45] Date of Patent: Aug. 22, 1989

[54] TAMPER-RESISTANT PACKAGING FOR PROTECTION OF INFORMATION STORED IN ELECTRONIC CIRCUITRY

[75] Inventor: Steve H. Weingart, Peekskill, N.Y.
[73] Assignee: IBM Corporation, Armonk, N.Y.
[21] Appl. No.: 927,298
[22] Filed: Nov. 5, 1986
[51] Int. Cl.[4] ........................ H01L 23/02; H05K 5/02; H04L 9/00
[52] U.S. Cl. ........................................ 380/3; 380/4; 380/52; 307/202.1
[58] Field of Search ............... 340/551, 552, 553, 561, 340/562, 567; 346/17, 20; 380/3, 4, 5, 52, 59; 342/27-28; 365/195, 196, 218; 307/200 R, 202.1; 235/451; 206/807

[56] References Cited

U.S. PATENT DOCUMENTS

| | | | |
|---|---|---|---|
| 3,108,257 | 10/1963 | Buchholz | 365/195 X |
| 3,366,939 | 1/1968 | Chaptal de Chanteloup | 365/195 X |
| 3,451,041 | 6/1969 | Marosi et al. | 340/551 X |
| 3,496,554 | 2/1970 | Stein | 365/195 |
| 3,666,967 | 5/1972 | Keister et al. | 307/202.1 |
| 3,670,837 | 6/1972 | Olson | 180/287 |
| 3,725,671 | 4/1973 | Keister et al. | 307/202.1 |
| 3,763,795 | 10/1973 | Wetz, Jr. | 109/24 |
| 3,825,920 | 7/1974 | Nelson et al. | 340/550 |
| 3,882,323 | 5/1975 | Smolker | 307/202.1 |
| 3,882,324 | 5/1975 | Smolker et al. | 307/202.1 |
| 3,943,503 | 3/1976 | Whitman | 340/552 |
| 4,110,738 | 8/1978 | Sattin | 340/539 |
| 4,168,396 | 9/1979 | Best | 380/4 |
| 4,179,691 | 12/1979 | Keller | 340/567 |
| 4,205,307 | 5/1980 | Liermann et al. | 340/644 |
| 4,225,859 | 9/1980 | Zetting et al. | 340/566 |
| 4,236,463 | 12/1980 | Westcott | 109/33 |
| 4,352,097 | 9/1982 | Hamann | 340/571 |
| 4,393,479 | 7/1983 | Du et al. | 365/218 |
| 4,459,583 | 7/1984 | Van Der Walt et al. | 340/589 |
| 4,471,163 | 9/1984 | Donald et al. | 380/4 |
| 4,512,000 | 4/1985 | Masuko | 340/552 X |
| 4,514,720 | 4/1985 | Oberstein et al. | 340/511 |
| 4,543,565 | 9/1985 | Oberstein et al. | 340/506 |
| 4,575,621 | 3/1986 | Dreifus | 235/380 |
| 4,593,384 | 6/1986 | Kleijne | 307/202.1 X |
| 4,691,350 | 9/1987 | Kleijne et al. | 380/3 |
| 4,734,883 | 3/1988 | Perkin | 365/218 |
| 4,783,801 | 11/1988 | Kaule | 380/3 |

FOREIGN PATENT DOCUMENTS

| | | | |
|---|---|---|---|
| 0058737 | 4/1985 | Japan | 365/218 |
| 0058738 | 4/1985 | Japan | 365/218 |
| 82/02274 | 7/1982 | PCT Int'l Appl. | 365/218 |

OTHER PUBLICATIONS

Chaum, "Design Concepts for Tamper Responding Systems"; *Advances in Cryptology*; pp. 387–392, 1984.
*IBM Tech. Discl. Bull.;* vol. 28, No. 4, 9/85; pp. 1488–1489.
Simmons, "How to Selectively Broadcast a Secret"; IEEE, 1985.
Purdy et al., "A Software Protection Scheme"; IEEE, 1982.
Kent, "Protecting Extrenally Supplied Software in Small Computers", Ph.D. Thesis, M.I.T., 1980.

*Primary Examiner*—Stephen C. Buczinski
*Assistant Examiner*—Bernarr Earl Gregory
*Attorney, Agent, or Firm*—Pollock, Vande Sande & Priddy

[57] ABSTRACT

A tamper-resistant package for protection of information stored in electronic circuitry includes apparatus for distributing electro-magnetic energy within a region occupied by the circuit to be protected. A sensing arrangement senses the distribution of the energy. In a preferred embodiment, electrical current is distributed through a coil or coils within which the circuit to be protected resides. The sensor includes an integrating circuit, and the output of the integrating circuit is presented to both a sample and hold circuit and to a comparator. The comparator has high and low reference input terminals which are fed from a voltage divider to which is also applied an output from the sample and hold circuit. The high and low reference inputs to the comparator are, by reason of the sample and hold circuit, adaptive. The comparator produces an output if its input is outside the limits established by the high and low reference inputs; that output of the comparator is taken as evidence of tampering. An impairing device responds to the comparator output to obliterate, destroy or otherwise impair the information stored in the electronic circuit which is being protected.

13 Claims, 3 Drawing Sheets

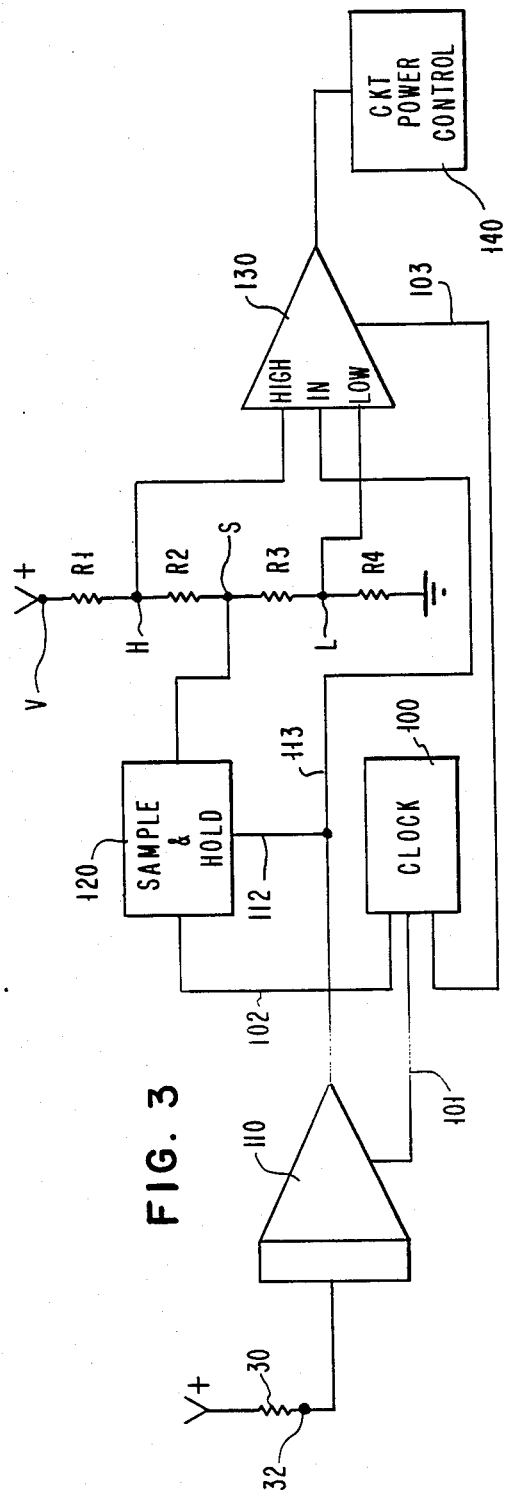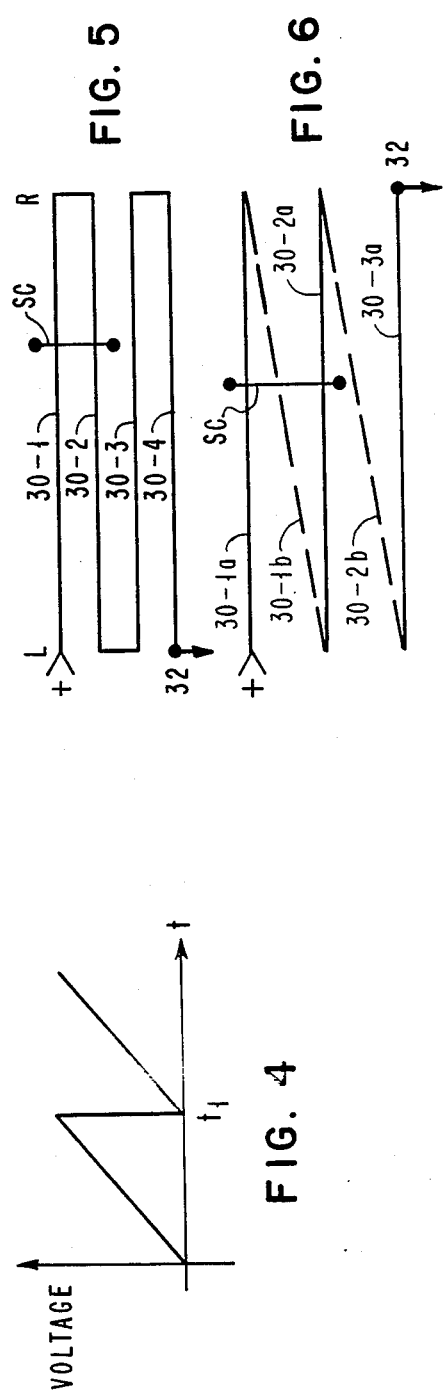

TAMPER-RESISTANT PACKAGING FOR PROTECTION OF INFORMATION STORED IN ELECTRONIC CIRCUITRY

DESCRIPTION

Technical Field

The invention relates to the provision of a physical security for information which is electronically stored and, more particularly, adaptive protection which simultaneously provides good sensitivity and protection against false alarms.

RELATED APPLICATIONS

Co-pending application Ser. No. 927,621, now U.S. Pat. No. 4,817,140, filed Nov. 5, 1986 discloses a software protection mechanism which in part relies upon the security of information stored in hardware devices. The present invention can be employed to provide the physical security required by the method described in the co-pending application.

Co-pending application Ser. No. 927,309, filed Nov. 5, 1986 discloses another tamper resistant package for protecting information stored in electronic circuitry.

The co-pending applications are assigned to the assignee of this application.

BACKGROUND ART

The prior art describes a wide variety of devices to provide physical security to protect objects from unauthorized removal. Generally, such protected objects have macroscopic qualities. However, there is a need to provide for security of information rather than objects. The breach in security required to surreptitiously withdraw information may be minuscule as compared to the breach required to withdraw a physical object. Hence the security provisions for information may be different in kind from that required to protect objects.

For the protection of programs or data contained in machine-readable form, the computer industry has traditionally relied on the physical security of the computer installation itself, or that security in combination with legal protection afforded by copyright, contract, trade secret and patent laws. Encryption has been used to prevent unauthorized persons from using intercepted information. In the PC area, many different software copy protection schemes are used, but all are based upon one or more software traps of some kind built into the program, and none are effective against the determined pirate.

One software protection mechanism is described in U.S. Pat. No. 4,471,163. To provide physical security for the information which may be stored in an electronic device, the patent describes that a circuit board on which the program lock is mounted is enclosed by top and bottom protective plates. Battery power for the components is supplied through a conductor which is glued to the inner surfaces of the protective plates By this technique, one attempting to gain access to the components on the printed circuit board would necessarily move at least one of the plates. Such movement results in breaking of the power lead to remove power from some of the components. If, as is suggested, the memory storing the information to be protected requires power, this interruption in the power lead would destroy the information that a pirate was seeking and therefore the information would remain protected. This tamper protection is of limited utility in that at most it can detect movement of that portion of the upper and lower cover plates which is directly glued to the power lead. A determined pirate with access to several such program locks could easily circumvent this protection, although it might mean destroying one or more circuit boards until he had discovered the extent of the protection.

In an entirely different field, Wetz, in U.S. Pat. No. 3,763,795 describes an alarm condition sensor to detect penetration of a vault or a safe. A panel is added to the exterior top, bottom, front, back and sides of the vault. Each panel is a composite of a frangible, opaque material on which a printed circuit is supported. The printed circuit is supplied with power and is arranged so that attempts to drill, cut or otherwise penetrate the panel will interrupt the electrical continuity of the printed circuit or short-circuit it to the exterior of the vault. While this protection may be quite effective in the context of protecting a vault, it has serious drawbacks in the context of protecting information.

Such vaults are usually located so that uninterrupted access to the vault is either impossible or difficult to procure. Because vaults are usually separately located, it is not practical for a thief to apply knowledge gained in a failure to breach a first vault in an attempt to penetrate other and different vaults.

On the other hand, electronic devices storing information may be widely distributed such that attaining uninterrupted access to such a device is not only not a problem, but it occurs regularly as a matter of course. It is conceivable that an attack on a device or installation to obtain information may be mounted in several stages:

1. Removal of covers or covers and any encapsulant;
2. Identification of the location and function of security sensors;
3. Bypassing of sensors to allow access to the next layer of protection, and so on.

Use of such carefully directed techniques (which can be likened to brain surgery) could, given sufficient time and resources, defeat existing protection systems. It goes without saying that, subject to such an attack, the protective system of Wetz would most certainly fail.

The design of most if not all alarm systems are subject to two competing considerations which typically require a compromise in implementing the desirable qualities of the alarm. On the one hand, we want our alarm device to be extremely sensitive to evidence of a threat; as the sensitivity increases the leeway allowed the pirate attempting to penetrate the protection contracts. On the other hand, our alarm system will be constructed out of real world devices and these are subject to environmental effects (changes in temperature, pressure, humidity, etc.) as well as aging (which can change a voltage supply, and device parameters, e.g. resistance, capacitance, etc.). The latter effect limits sensitivity to that which will not generate false alarms as device parameters change.

The systems described in U.S. Pat. Nos. 3,825,920; 4,459,583; 4,205,307; 4,225,859; 4,514,720 and 4,543,565 provide improved alarm sensors that are directed not at protecting information, but at protecting macroscopic objects or spaces.

Thus, it is an object of the invention to provide a system for the protection of information which may be stored in electronic circuits or the like in which the sensitivity to detection of intrusion is not compromised by providing for protection against false alarms. It is a concomitant object of the invention to provide physical protection for information which may be stored in electronic circuits in which achieving desirable sensitivity does not result in false alarms.

SUMMARY OF THE INVENTION

The invention meets these and other objects by providing a tamper-resistant package for protecting information stored in an electronic circuit. The package usually includes an enclosure which substantially surrounds the electronic circuit.

A sensing arrangement is provided within the enclosure for sensing an intrusion within the enclosure. In order to perform the sensing function, electromagnetic energy is distributed within the enclosure. Apparatus is provided to detect the energy distribution. That apparatus includes a sensor, a clock, a sample and hold circuit which is driven by the sensor and periodically clocked to sample and store an output of the sensor.

In a preferred embodiment, the sensor includes an integrating circuit. In this preferred embodiment, the electromagnetic energy is distributed under the influence of a source of electrical current and a coil of insulated electrical conductors coupled, at one terminal to the source, and wrapped to surround the electronic circuit with another terminal of the electrical conductor coupled to the sensor.

Accordingly, electrical current is input to the sensor, the amplitude of which is related to the resistance provided by the electrical conductor. The output of the sensor, including the integrating circuit, normally has a ramp waveform wherein the rate of change of the output is linear and inversely proportional to the resistance provided by the electrical conductor. Normally, the resistance is constant, producing a constant slope or ramp waveform. To the extent that the resistance varies during the course of the integration period, then the slope of the waveform will also vary and as a consequence the amplitude reached by the waveform at any time in the integration period will also vary.

A comparator is provided and is connected to the output of the sensing arrangement. The comparator is coupled to at least one reference value to which the input from the sensor will be compared. This reference value is determined in part by the output of the sample and hold circuit. The comparator produces a distinctive output when these two inputs differ by more than a predetermined threshold.

The sensitivity of the invention is enhanced while at the same time providing protection against false alarms caused by slow drifting of parameter values or the like. In the absence of a sample and hold circuit, or something similar thereto, we would be constrained to provide a constant reference for comparison to the output of the sensing arrangement.

Because of inherent drift in real world devices, and in order to minimize false alarms, we would be constrained to live with a relatively large threshold. For example, if we predicted that over the lifetime of the apparatus, 10% drift should be accommodated to minimize false alarms, then the threshold would necessarily be at least 10%. This threshold then sets the sensitivity.

However, the sensitivity is increased without at the same time increasing the risk of false alarms by the use of the sample and hold circuit controlling the value of the reference. Thus, rather than using a fixed reference, we have a variable or adaptable reference which is set by the output of the sample and hold circuit. The clock determines the rate at which new samples are accumulated. Now the threshold need only be sufficient to accommodate drift expected with one clock cycle. Thus, we can use a relatively small tolerance to provide for enhanced sensitivity. False alarms are minimized since a slow drift (slow relative to the clock) will update the reference or adapt the reference sufficiently fast so that false alarms are avoided.

In the event the comparator does produce an output, representing a change in the sensor value in excess of our threshold, then evidence is present of tampering. Accordingly, we provide apparatus to impair the electronic circuit or at least the information stored therein. Typically, the electronic circuit may be a random access memory. Many such devices are dynamic in that they require power input to maintain the information. Accordingly, the impairing means can be merely an arrangement to terminate or inhibit the flow of energy used to maintain the information in the RAM. Other arrangements are within the spirit and scope of the invention; in some forms of memory (EPROM) UV light is used to "erase" the memory. Thus, alternatively the impairing means can include a source of such UV light and an arrangement to energize the source in the event the comparator produces the output we are looking for.

Accordingly, in one aspect the invention provides a tamper-resistant package for protecting information stored in an electronic circuit comprising:

sensing means distributed about said electronic circuit for sensing an intrusion, said sensing means including:

means for distributing electromagnetic energy about said electronic circuit, means for detecting said energy distribution including:

a sensor, a clock, sample and hold circuit means coupled to said sensor and clocked periodically by said clock to sample and store an output of said sensor, a comparator with at least one input subjected to a signal from said sample and hold circuit means and another input from said sensor, and impairing means for impairing said electronic circuit or the information stored therein in response to an indication from said comparator of an intrusion or an attempted intrusion into said enclosure.

Because the sample and hold circuit is capable of providing only a single input to the comparator, we must provide the sensor-generated input in a corresponding fashion. We could, for example, merely compare a measure of the resistance of the electrical conductors at an instant in time with the signal representing the value stored in the sample and hold circuit. A drawback to this approach is that we are in effect only sensing at discrete instants and have no coverage for events occurring outside the sensing instants. Accordingly, the sensor includes an integrating circuit which is arranged to perform an integration on the resistance measurement over the period of the clock. The value stored in the sample and hold circuit is a corresponding measurement so that when we compare the value from the sample and hold circuit to the value provided by the sensor we are in effect providing coverage throughout the entire clock period. The integrator also has the value of improving noise immunity.

Tampering can affect the resistance of the electrical conductor in either of two senses, e.g. if the conductor is open circuited, the resistance will increase dramatically, if a conductor is damaged the resistance will tend to increase, whereas if one portion of the conductor is short circuited to another portion the resistance will tend to decrease.

We want to be able to sense variations in both senses. To this end, the comparator has provision for three inputs, one from the sensor, and both high and low reference inputs. The reference inputs are derived from a voltage divider which is connected between a predetermined voltage and ground or any other suitable potential. The output of the sample and hold circuit is also coupled to the voltage divider, at an intermediate point. Two taps are provided on the voltage divider, one of which is connected to the high reference input of the comparator and the other is connected to the low reference input. The signal provided by the high reference tap is thus a function of the difference between the predetermined reference voltage and the output of the sample and hold circuit, whereas the low reference tap has a voltage which is the difference between ground (or other potential) and the output of the sample and hold circuit. In this fashion, we derive high and low adaptive reference signals for the comparator.

In order to produce a sufficiently protective package for sensitive circuit devices, the sensing element must leave no "holes" through which small probes or other intrusions could be inserted. The sensing element should be fragile so that attempts to attach to the element or a component of the element, to bypass it, will tend to break the sensing element or at least a component thereof. The material of the sensing element is chosen to make attachment difficult. High resistance per unit length is also a desirable quality. Randomness in the placement of the element is also desirable. This minimizes the intelligence a pirate can achieve by "sacrificing" a unit for measurement purposes and then employing that information in attacking a second unit.

In accordance with a preferred embodiment of the invention, a very fine wire was chosen as the sensing element. Insulated nichrome wire having a diameter of about 35/10,000ths of an inch is used and wrapped around the circuit or circuits to be protected. Preferably, multiple layers are used and each layer is close- or scramble-wound to completely cover all exposed surfaces. Nichrome wire is difficult to attach to and the small size of the wire increases this difficulty. Separate wraps in multiple axes make the package even more secure. It should be apparent that other suitable sensing elements are available; aluminum, other steel alloys and some of the exotic materials are possible substitutes for the nichrome wire explicitly referred to above.

Further protection is achieved by potting the package after it is wrapped. Preferred potting material is an opaque, cross-linked filled epoxy. By using a slightly loose wrapping tension combined with the small size of the selected wire and the opacity of the epoxy, there is randomness in the position of individual turns. This requires the pirate to work slowly if trying to mechanically work into the epoxy but yet stop before damaging one of the wires. The sensing arrangement is arranged to detect the breaking or merely damaging of a wire (causing the opening of the circuit or an increase in resistance) or shorting different points on the wire (since the resulting change in resistance will be detected). The epoxy filler (alumina or silica) makes machining difficult. If the pirate chooses to use a solvent or chemical, the insulation on the wires (such as polyurethane or polyolefin) and perhaps even the wire, will dissolve more easily than the epoxy. If UV laser ablation is used, the inorganic fillers will generate a great deal of heat and this can cause cracking due to mechanical stress from the thermal gradient. This will tend to break a wire which will enhance detection. The reaction to heat to facilitate detection can be enhanced by incorporating a thermally sensitive device, such as a bi-metallic device, in the potting material. Incorporation of such a device has a tendency to produce mechanical motion in response to heat to increase the probability of mechanically cracking the sensing element.

The nichrome wire wrapped around the package to be protected forms a distributed resistance element. The resistance is measured by the sensor. If the element is broken or its resistance altered, the circuitry tends to detect it. To increase the detector's sensitivity to shorts, the wire is wrapped as several strands which are connected in series after winding. As a result, adjacent turns of the wrap are further apart on the distributed element than adjacent turns of a single strand would be. This increases sensitivity because three out of every four nearby wires (for example) are resistively further away than the next turn around the package. If two randomly selected but adjacent wires are shorted together, it is likely that there will be a significant change in the total resistance which enhances detection. Another advantage of multiple strand wrapping is the effect it provides of bifilar winding. This reduces EMI pickup due to cancellation. The sensor is potted in a hard opaque epoxy to make it difficult to access the circuitry inside the wire by merely displacing the wire. The wire wrap also forms an EM shield, reducing radiation from the circuitry within, further increasing security.

BRIEF DESCRIPTION OF THE DRAWINGS

The invention will now be described in further detail so as to enable those skilled in the art to practice the same, in the following portions of the specification when taken in conjunction with the attached drawings in which like reference characters identify corresponding apparatus and in which:

FIG. 3 is a circuit diagram of the sensing apparatus employed with the apparatus schematically illustrated in FIG. 1;

FIG. 4 is a waveform diagram showing the output of the integrator 110 of FIG. 2 under certain circumstances;

FIG. 5 is a winding diagram showing how the conductor 30 can be wound in accordance with one embodiment of the invention; and FIG. 6 is an alternative winding diagram.

DETAILED DESCRIPTION OF PREFERRED EMBODIMENTS

Figure 1:
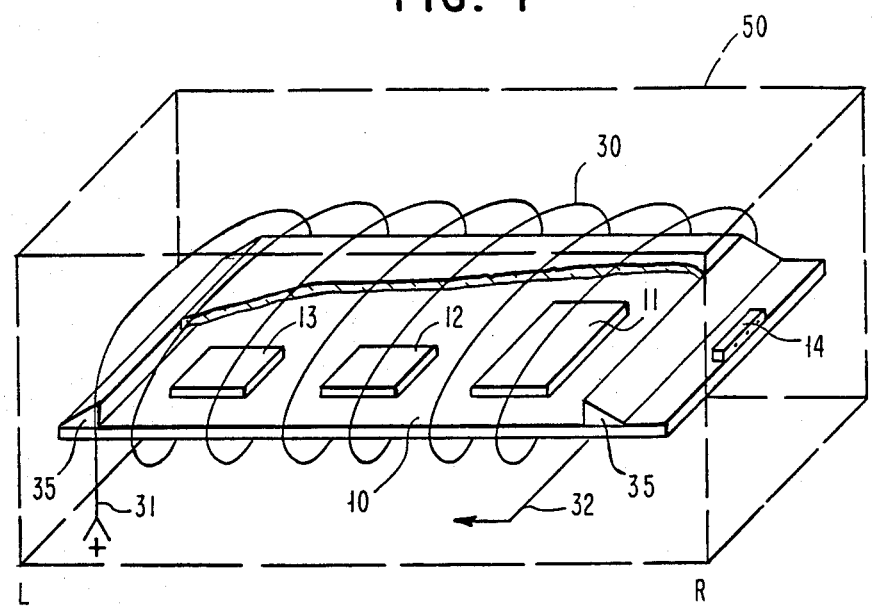
FIG. 1 is a schematic illustration of application of the invention for the protection of information stored in electronic circuits.

FIG. 1 shows an electronic circuit card 10 on which electronic circuitry, in the form of chips 11-13, are mounted. The printed circuit wiring interconnecting the chips 11-13 is not specifically illustrated nor does the illustration include the printed circuit wiring connecting these chips to the off-card connector 14. The card 10 is exemplary of a wide variety of devices which are used to store information which may be sensitive. One example of such information is described in the co-pending application Ser. No. 927,629. The stored information is accessible through the connector 14; protection from unauthorized access via this path is outside the scope of the invention. It is the purpose of the invention to ensure that the information stored in the circuitry is not accessible by any other means. The basic purpose of the invention is satisfied by ensuring that nothing is capable of intruding within a protected space within which the card 10 is contained. Shown dotted in FIG. 1 is an enclosure which is typical of many enclosures within which a card such as the card 10 may be retained. In order to detect intrusions, the invention provides a sensing apparatus which is distributed in the enclosure for sensing intrusion within the enclosure. The sensing apparatus includes some instrumentality for distributing electromagnetic energy, along with further apparatus to detect that distribution. It is a variation or interruption in the distribution of the electromagnetic energy which is employed to sense intrusion. In many applications the information sought to be protected is stored in volatile devices wherein the information is retained by the application of power. The invention contemplates controlling the application of power to the volatile devices so as to interrupt that application of power (and preferably ground the power terminal) or impair the function of the electronic devices upon sensing an intrusion. That interruption can be effected by a simple switch if it is properly controlled. Application of the invention does not, however, require use of volatile information storage devices. In other embodiments of the invention, devices are provided whose sole purpose is to interrupt or impair the storage of information in the event an intrusion is detected. For example, EEPROM devices are erasable on application of ultraviolet light. It is within the scope of the invention to provide a source of ultraviolet light and apparatus to energize that source in the event an intrusion is detected.

As shown in FIG. 1, one element for sensing the presence of an intrusion is a closely spaced coil of insulated conductor 30; in the showing in FIG. 1, the spacing of adjacent turns of conductor 30 is exaggerated so as to reveal the card 10 located interior of the coil formed by the conductor 30. In practice the coil is sufficiently tightly wound so that the presence of the coil itself physically prevents access to the card 10. The attacker then is forced to displace one or more turns of the conductor 30 so as to obtain access, and it is a thesis of the invention that the apparatus is arranged to inhibit or prevent displacing the conductor or at least sense any attempt to displace the conductor 30. In a preferred embodiment the conductor 30 is formed of insulated nichrome wire which is relatively thin, for example about 35/10,000ths of an inch. This provides two advantages, the conductor 30 is relatively fragile so many attempts to displace it will result in actually breaking the conductor which is a basis for detection, as is described below. It is conceivable that an attacker would attempt to physically remove portions of the conductor 30 and fool the protection system into thinking the conductor 30 was present by bypassing or simulating the effect of the portion of the conductor 30 which had been removed. Use of the relatively thin nichrome wire renders this effort difficulty to accomplish since the nichrome wire is difficult to attach to.

Figure 2:
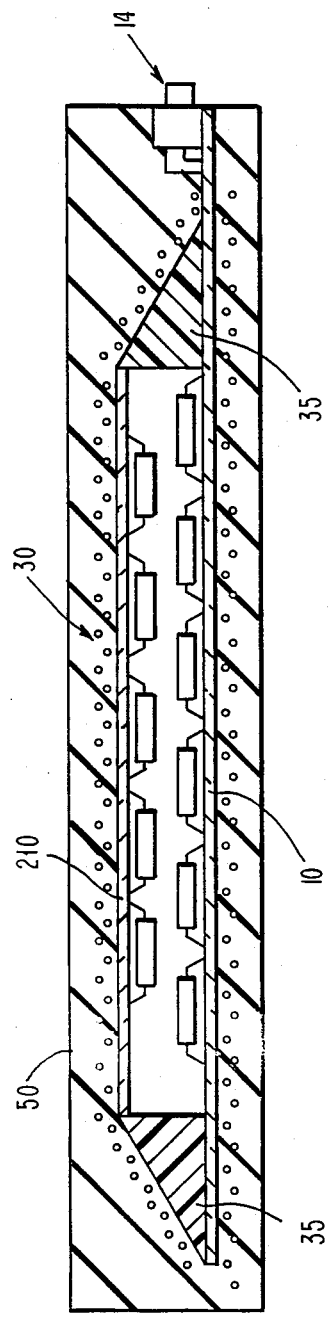
FIG. 2 shows, in section, an electronic circuit card protected in accordance with the invention.

FIG. 2 shows, in section, how a card such as the processor card 10 can be protected in accordance with the invention. More particularly, the protection card 210 is mounted within an enclosure in common with the processor card; the protection card includes the circuitry shown schematically in FIG. 3. Distributed about the processor card 10 (so as to include therein the protection card 210, as well) is the winding made up of the conductor 30. As shown in FIG. 2, two ramps 35 are used to support the winding beyond the ends of the processor card 10/protection card 210. The winding, made up of the conductor 30 as well as the components interior thereof, are enclosed within the potting material 50. The winding, consisting of the conductor 30, is arranged so that intrusion into the interior, e.g. the space occupied by the processor card 10, is not possible without disturbing one or more turns of the conductor 30, and it is a thesis of the invention that such a disturbance will be detected in order to evidence intrusion.

Reference is now made to FIG. 3 which shows a detection circuit. More particularly, a voltage source is coupled to one extremity of the conductor 30, the other end of which is coupled as an input to an integrator 110. The output of the integrator is connected as an input, via the conductor 112 to a sample and hold circuit 120 and also via the conductor 113 to the input terminal of a comparator 130. The integrator 110 is periodically clocked by a signal from the clock 100 over the conductor 101. Likewise the sample and hold circuit 120 is periodically reset by another signal from the clock 100 over the conductor 102. Each time sample and hold circuit 120 is clocked it acquires a new sample of the output of integrator 110. The output of the sample and hold circuit 120 is coupled to a voltage divider V at a terminal S. The voltage divider V is coupled between two reference potentials such as a positive voltage and ground. At a point H between one of the reference potentials and the connection point S, an input is tapped off for a high reference input to the comparator 130. At another point L, located between the other reference potential (ground) and the point S, another potential is tapped off and used as an input to a low input of the comparator 130. The comparator 130 is also clocked by a signal from the clock 100 over the conductor 103. Devices corresponding to clock 100, integrator 110, sample and hold circuit 120 and comparator 130 are commercially available and are not further described herein.

Under normal circumstances, current flows through the conductor 30, the amplitude of that current depends in part on the resistance presented by the conductor 30, and that current flows as an input to the integrator 110. The integrator produces an output, on the conductor 113, which is voltage varying with time. FIG. 4 shows the waveform at the output of the integrator 110 under the assumption that the resistance of the conductor 30 and the voltage supply are constant in time; under these circumstances, the voltage output of the integrator 110 is in the form of a ramp. FIG. 4 shows that the integrator 110 is periodically reset, e.g. at the time $t_1$ by the clock 100. When the integrator is reset, its output voltage drops to zero and then begins increasing again.

The clocking input to the sample and hold circuit 120 is active prior (preferably, just prior) to the time the integrator 110 is reset ($t_1$) to allow the sample and hold circuit 120 to acquire a voltage sample over the conductor 112. A voltage corresponding to this sample is provided by the sample and hold circuit 120 at the point S, and this voltage is held constant until the next clock pulse on conductor 102 enables the sample and hold circuit 120 to acquire a new sample.

The comparator 130 compares its input voltage to the signals at its high and low input terminals; in the event that the input voltage exceeds the high input voltage or is less than the low input voltage, an output is provided to the circuit power control 140. Thus there is a window between the potentials at the points H and L within which the comparator 130 will not respond. Since this window is determined in part by the sample and hold circuit 120, the window will adapt to changes in the sensor parameters. The circuit power control 140 may, in some embodiments, be a simple switch which interrupts application of power to the chips 11-13 which store information to be protected. On the other hand, the circuit power control 140 may initiate or enable some device to, in some other fashion, impair the ability of the chips 11-13 to maintain information stored therein.

It should be apparent to those skilled in the art that the level of the reference inputs (high and low) to the comparator 130 are a function of the voltage at the point S produced by the sample and hold circuit 120. As this voltage tends to rise, so will the reference voltages H and L, and likewise as the voltage at the point S falls, so too will the reference voltages at H and L. However, at any instant in time the comparator 130 is comparing its input from the integrator 110 to the reference level determined by the sample acquired in the prior cycle. Nominally, the parameters are arranged so that the output of the integrator 110 is substantially equal to the voltage at the point S when the clock 100 clocks the comparator 130. If, because of parameter changes, the output of the integrator 110 at the compare time varies from cycle to cycle, the comparator 130 may or may not produce an output depending on the extent of that variation. If the output of the integrator 110 lies between the voltages established at H and L, then the comparator 130 will not produce an output, and vice versa. The circuit in effect provides the comparator 130 with the means for sensing the resistance change in the conductor 30. Because of the sample and hold circuit 120, and its connection to the voltage divider V, the circuit has an adaptive nature; as the parameters vary the reference levels will also vary. The comparator 130 will not be tripped unless the variation within one cycle exceeds the variation permitted by the divider $R_1$, $R_2$, $R_3$, $R_4$.

More particularly, if we assume a window with high ($E_H$) and low ($E_L$) thresholds, respectively, $E_H$ is given as $I_2+(V-I_1)R_2/R_1+R_2$, and $E_L$ can be given as $I_2-(I_1)R_3/R_3+R_4$, where:

$I_2$ is the integrator output at a clock pulse on the comparator, $I_1$ is the integrator output at the prior clock pulse to the sample and hold, and $R_1$, $R_2$, $R_3$ and $R_4$ form the voltage divider chain with $I_1$ being input between $R_2$ and $R_3$.

The comparator produces a tamper indicating output when:

$I_2 > E_H$ or $I_2 < E_L$.

The resistance of the conductor 30 can vary by one of three physical mechanisms; the resistance will vary if the conductor 30 becomes open-circuited or if adjacent or closely adjacent turns are shorted to one another or if the conductor is damaged with the effect of reducing the cross-section. Clearly an intrusion can be implied on detection of such a circumstance.

Open circuiting of the conductor 30 will dramatically change the output of the integrator 110 and in all or nearly all cases that dramatic change will be almost instantaneous and undoubtedly detected by the comparator 130.

The extent to which a short between the adjacent or nearly adjacent turns of the conductor 30 will be detected depends on the resistance change introduced by the short circuit. It should be apparent that if the coil was a single strand, it is conceivable that a short circuit would cause a change in resistance which might easily go undetected (1% or less). FIG. 5 is a winding diagram illustrating how the effect of a short circuit can be dramatically increased. Rather than using a single strand for the conductor 30, it is made out of a plurality of strands, FIG. 5 shows strands 30-1 through 30-4. The four strands are first connected to the circuit, strand 1 going to V, strands 2 and 3 being tied together, and strand 4 going to the input of the integrator. The four strands are then wound simultaneously onto the enclosure. After the strands are wound; the outside ends of strands 1 and 2, and strands 3 and 4 are tied together to form a single conductor. The ends are the tucked beneath the surface of the winding. FIG. 5 also shows an exemplary short circuit SC. It is also possible (but not preferred) to wind the strands one after the other, and then connect appropriate strand ends to form a single continuous conductor. It should be apparent from FIG. 5 that even if only two adjacent turns are shorted together, the resistance change can be as much as 25% (for a four strand coil). If more than two adjacent strands are shorted together, the resistance change can be even more dramatic.

FIG. 6 shows an alternate winding arrangement in which all the strands are wound left to right (for example), and a "hidden" return is used so all strand ends are available at the left (for example). More particularly, as shown in FIG. 6, the strand 30-1 includes a first portion 30-1a which is wound left to right, but a contiguous portion 30-1b is returned to the left-hand edge. The return portion 30-1b is returned interior of the winding. Similarly, strand 30-2 has a "hidden" return 30-2b. When all strands are wound, the terminal portion of 30-1b can be connected to the available end of 30-2a, and the terminal portion of 30-2b is connected to the available end of 30-3a, etc. It should be apparent that this winding arrangement still further increases the effect of a short circuit, especially for short circuits near either end of the winding.

To further enhance the protection provided by the invention, after the conductor 30 is wrapped, the entire package, e.g. the card and the coil along with the sensing circuit, is potted preferably in an opaque, cross-linked filled epoxy. Filler materials such as alumina or silica provide advantages in making machining (a process that might be used by an attacker) difficult. Another potential attack through the epoxy is the use of a solvent or chemical; in this case the insulation of the wires (for example polyurethane or polyolefin) and possibly even the wire itself may dissolve before the epoxy. In response to UV laser ablation, the inorganic fillers will generate a large amount of heat; this heat will attack the conductor 30 and may cause cracking due to mechanical stress from thermal gradients. Of course, breaking of a wire will open the circuit and be detected.

There is wide latitude in selecting the manner in which the strands are wound in accordance with the invention. Close winding can be employed; close winding is a conventional technique which produces a smooth even wrap such as seen in a spool of thread. That is, each of the turns are regular and essentially parallel to each other. On the other hand, a scramble winding technique could also be employed. Scramble winding is another conventional winding technique which produces an irregular winding such as seen for example in a ball of twine.

Further advantage is gained by wrapping or coiling the conductor 30 about more than one axis, that is a first layer of the conductor 30 is wrapped about one axis, a second layer wrapped about a different axis, etc. For example, at least two axes are used which are mutually perpendicular. In wrapping the conductor 30 about the card 10, a completely enclosed volume is produced so that there are no "holes". Thus, beyond the extremities of the card 10, a single winding layer will abut to "close the ends".

Use of multiple strands and multiple layers enhances protection from EMI pickup because of cancellation. The wire wrap produced by the conductor 30 also forms a EM radiation shield.

As so far described, the invention provides for a single sensing element consisting of a power source, a conductor, and a detecting circuit; it is within the scope of the invention to use multiple sensors, each one of which includes the enumerated elements.

From the preceding, it should be apparent that there are many variations coming within the spirit and scope of the invention which is not to be limited by the example particularly described above but which is to be construed in accordance with the attached claims.

Having thus described my invention, what I claim as new, and desire to secure by Letters Patent is:

1. A tamper resistant package for protecting information stored in an electronic circuit comprising:
sensing means distributed about said electronic circuit for sensing an intrusion, said sensing means including:
   means for distributing electromagnetic energy about said electronic circuit,
   means for detecting said energy distribution including:
      a sensor,
      a clock,
      sample and hold circuit means coupled to said sensor and clocked periodically by said clock to sample and store an output of said sensor,
      a comparator with at least one input subjected to a signal from said sample and hold circuit means and another input from said sensor,
and impairing means for impairing said electronic circuit or the information stored therein in response to an indication from said comparator of an intrusion into said enclosure.

2. The tamper resistant package of claim 1 in which said means for distributing electromagnetic energy includes:
   a source of electrical current,
   a coil of insulated electrical conductors coupled at one terminal to said source and wrapped to surround said electronic circuit, with another terminal of said electrical conductors coupled to said sensor.

3. The tamper resistant package of claim 1 or 2 in which said sensor includes an integrating circuit coupled to said means for distributing and periodically reset by said clock.

4. The tamper resistant package of claim 3 which further includes a divider coupled between two reference signals with an intermediate point coupled to said signal from said sample and hold circuit means and
   in which said comparator has a first input coupled to said sensor, and second and third inputs coupled to different points of said divider.

5. The tamper resistant package of claim 2 in which said insulated coil of electrical conductors includes Nichrome wire.

6. The tamper resistant package of claim 2 or 5 in which said conductor has a diameter on the order of 0.0035 inches.

7. The tamper resistant package of claim 2 in which said coil of insulated electrical conductors is close wound.

8. The tamper resistant package of claim 2 in which said coil of insulated electrical conductors is scramble wound.

9. The tamper resistant package of claim 2 in which said coil of insulated conductors includes at least two strands both of which are individually wrapped and means joining one extremity of one strand to an adjacent extremity of another strand.

10. The tamper resistant package of claim 2 which further includes a cross-linked epoxy in which said electrical circuit to be protected and said coil of insulated electrical conductors is potted.

11. The tamper resistant package of claim 10 in which said epoxy is filled with Alumina or Silica.

12. The tamper resistant package of claim 2 or 10 in which said coil is wrapped to provide random positioning of conductors.

13. The tamper resistant package of claim 2 in which said coil includes a first coil portion wrapped about a first axis and serially connected thereto a second coil portion wrapped about a second, different axis.

* * * * *

UNITED STATES PATENT AND TRADEMARK OFFICE
CERTIFICATE OF CORRECTION

PATENT NO. : 4,860,351

DATED : August 22, 1989

INVENTOR(S) : Weingart

It is certified that error appears in the above-identified patent and that said Letters Patent is hereby corrected as shown below:

Col. 1, line 15, "927,621" should be -927,629- and "now U.S." should be deleted;

line 16, "Pat. No. 4,817,140" should be deleted.

Col. 7, line 67, "difficulty" should be -difficult-.

Col. 10, line 28, "the" should be -then-.

Signed and Sealed this

Fourth Day of September, 1990

Attest:

HARRY F. MANBECK, JR.

*Attesting Officer*        *Commissioner of Patents and Trademarks*